United States Patent [19]

Braunstein et al.

[11] Patent Number: 4,998,275

[45] Date of Patent: Mar. 5, 1991

[54] MULTI-LINE TELEPHONE COMMUNICATIONS SYSTEM

[75] Inventors: Marcel Braunstein, Ringwood, N.J.; Craig Hauser, New York, N.Y.

[73] Assignee: Contel, IPC, Inc., Stamford, Conn.

[21] Appl. No.: 883,295

[22] Filed: Jul. 7, 1986

Related U.S. Application Data

[63] Continuation of Ser. No. 683,347, Dec. 19, 1984, abandoned.

[51] Int. Cl.[5] .............................................. H04M 1/72
[52] U.S. Cl. ..................................... 379/164; 379/165
[58] Field of Search ............... 379/156, 165, 164, 157, 379/231, 229, 235, 383, 384

[56] References Cited

U.S. PATENT DOCUMENTS

| | | |
|---|---|---|
| 3,150,238 | 10/1961 | Carter . |
| 3,757,056 | 9/1973 | Foulkes . |
| 3,843,845 | 10/1984 | Ridley . |
| 3,931,481 | 1/1976 | Jackson . |
| 4,109,113 | 8/1978 | Allison, Jr. et al. ............... 179/99 R |
| 4,278,844 | 7/1981 | Jones ................................. 379/164 X |
| 4,536,621 | 8/1985 | Bergen et al. ..................... 179/99 R |
| 4,551,583 | 11/1985 | Sekiguchi et al. .............. 379/165 X |

OTHER PUBLICATIONS

Keith, W. H., "A New Switching System for Right--of-Way Companies", Bell Labs Record, Apr. 1968.

Primary Examiner—James L. Dwyer
Attorney, Agent, or Firm—Morgan & Finnegan

[57] ABSTRACT

There is disclosed a multi-line telephone communications system where the need for the hundreds of conductors that are necessary to connect each station to the control and switching equipment is eliminated. This is achieved by replacing the status indicating leads with analog signals impressed upon the voice leads. A specific signal level is assigned to each of the ring, busy, idle and hold functions so that the voice leads carry both the audio signal and status information signal for each line selectable at the telephone station. In response to activation of the telephone keys by the user a cross point switch establishes a voice signal connection between a selected voice line and a talk path associated with the selecting telephone station. A status signal representative of the status of at least the connected voice line and distinct from voice signals is impressed upon the voice line. This status signal is detected and processed for activating the status indicators at each telephone station. Assignment of lines to particular keys of a telephone station is achieved by storing the assignment in a programmable memory. Whenever a line assignment is to be changed from one key to a different key, it is necessary only to enter the change by reprogramming the memory.

22 Claims, 5 Drawing Sheets

MULTI-LINE TELEPHONE COMMUNICATIONS SYSTEM

This is a continuation of co-pending application Ser. No. 683,347, filed on 12/19/84, now abandoned.

BACKGROUND OF THE INVENTION

This invention related to multi-line telephone communications systems having one or more telephone units of which each provides access to several telephone lines and visibly indicates the status of each such line.

Multiple-line key telephones, sometimes referred to as "trader turrets", are widely used in rapid communications networks such as trading operations in banks, brokerage houses and other financial institutions. Telephones of this type provide direct access to several outside lines with the simple depression of a single key on the telephone. Dialing is unnecessary. Each telephone unit, also referred to as a telephone station, may be capable of selecting any of one-hundred, or even two-hundred, different lines, and should at the same time provide all normal telephone functions, i.e., dialing, ringing, hold, etc. One essential requirement is that each telephone station furnish an indication of the present status of each of the lines accessible at the particular station. This indication usually takes the form of a continuously lighted key for a "busy" line, a flashing key for a line on "hold" or for a "ring" on an incoming call, and a non-lighted key for a free line. In addition, the station should have the capability of indicating which line the user has picked up.

In older telephone equipment, indications of lines in use was achieved by the use of locking pushbuttons. Although all key-selecting buttons on the telephone might be lighted, the depressed key position let the user know the line he was using. The use of non-locking pushbutton keys, on the other hand, requires another type of visual indication, e.g., a lighted key or indicator. An earlier turret system using non-locking pushbuttons is described in U.S. patent Re. No. 31,144 for "Multi-Station Telephone Switching System", assigned to the assignee of the present invention.

Conventionally, all telephone systems, including those using non-locking pushbutton keys for line selection, have provided line status indication by sending a lamp excitation signal over a separate conductor for each indicator lamp. Large multiple-conductor buses carry the lamp excitation signals to each telephone station. Thus, a 200-line telephone station would require that no less than 200 conductors be connected to it merely to furnish the line status indication. In order to light the same key at each telephone station, each station must be coupled to its own 200-conductor bus. This requirement for huge numbers of status-indicating conductors in multi-station telephone systems, such as those adapted for large brokerage trading rooms, made installation and maintenance of the system difficult. Moreover, valuable space was needed upon and within the telephone console, as well as in the "equipment room" where the telephone switching equipment is located.

In addition to the huge number of lamp leads found in conventional systems, other special function conductors are generally required. These conductors, called A-leads and "Ring-not" leads, are used for hold and ringing functions In a conventional 200-line turret, where 3 conductors (an A-lead, a lamp indicating lead and a ring-not lead) were associated with each line, some 600 individual conductors might be needed, not counting the two voice leads. It can be appreciated that with such a large number of conductors to be routed, space, installation and maintenance pose increasing challenges and difficulty.

It is highly desirable to provide flexibility in the assignment of lines to individual telephone stations, i.e., to provide the opportunity for changing the lines assigned to particular keys of the telephone. In many conventional telephone systems, it is possible to change the line assignment, but only by physically changing or reconnecting wires at the switch crosspoints, or at the telephone station. This approach is cumbersome and reduces the ease with which the system may be installed and serviced.

In the telephone communictions system described herein the assignment of lines to particular keys of a telephone station is completely flexible, this being achieved by storing the assignments in a programmable non-volatile electronic memory. Whenever a line assignment is to be changed from one key to a different key, it is necessary only to enter the change by reprogramming the memory. Reprogramming can be done through a personal computer terminal interfacing with the telephone equipment.

A high degree of reliability is another requirement of multi-line key telephone systems. As noted above, in multi-line "trader turrets", immediate access to an outside line can be extremely critical A system-wide breakdown obviously would be disasterous, since it would cut off all communication between the traders and the outside world. Therefore, a high degree of reliability of the overall system is required. This means reliability both in establishing connections between the telephone station and a given outside line, and in ensuring against a larger-scale breakdown in the event of electronic or mechanical component failure.

The present invention is adaptable to distributive logic, which minimizes the effect of unusual or unexpected equipment and component failures. This is achieved by making all incoming lines available to every telephone station. An internal failure at a particular telephone station does not interfere with the other stations. Similarly, telephone data processing may be handled in several individual "cards", each of which controls only a limited number of (e.g., four) lines or telephone stations. Thus, a failure in a "line card", due to electrical overloading, for example, affects at most four lines. In the event of failure, all stations have access to all remaining outside lines. A failure in a "master card" would cause four telephone units to be unusable, but all lines would remain operative from the remaining station. In either case the malfunction is corrected by simply replacing the failed card.

SUMMARY OF THE INVENTION

The present invention makes possible the elimination of the hundreds of conductors that are often necessary to connect each station to the control and switching equipment. Specifically, the eliminated conductors are the lamp leads, the ring-not leads and the A-leads for each line key and its associated lamp indicator. This is achieved by replacing these leads (and the signals they normally carry) with analog signals impressed upon the voice leads. In this manner, a specific signal level (e.g., a d.c. voltage level) can be assigned to each of the "ring", "busy", "idle" and "hold" functions, so that the voice leads carry both the audio signal and status information for each line selectable at the telephone station.

Line status information, in accordance with the present invention, may be processed digitally at a remote location (e.g., the telephone equipment room) and sent to each telephone station over one or more separate digital communication links. Each telephone is an intelligent station capable of processing the digital data sent to it and, in response, lighting its own status-indicating lamps. In addition, the station is capable of scanning the entire key field to detect any line being selected by the user, developing a digital signal representative of this selection and then transmitting a digital signal to the remote telephone equipment, the latter addressing an electronic crosspoint switch to connect or disconnect the selecting station with the selected line.

In sum, the architecture of the telephone system of the invention is structured so that each station requires only a minimal number of conductors interconnecting it with the remote processing equipment. A single voice line pair and two pairs of digital data lines suffice for all voice and data communication between the station and the processing equipment. This is contrasted with the hundreds of leads required in conventional systems.

As described below in more detail, an internal voice line, selectable by the keys of the telephone station is coupled to each of the respective external telephone lines. Electronic crosspoint switch means remote from the telephone station (e.g., in the equipment room) responds to activation of the telephone keys, to create a voice signal connection between the selected voice line (corresponding to the key pushed) and a talkpath (i.e., the voice communication path) associated with the telephone station from which the selection is made. A signal representing its operative status is impressed upon this voice line, the signal being distinct from the voice signals. This status signal is detected and processed for activating the status indicating means at each telephone station.

In the preferred embodiment, the status signal is an analog signal that is converted to a digital signal, the converted signal being transmitted serially over a single conductor to the telephone station. There the digital signal is analyzed and the appropriate indicator lamps are illuminated in response. Since the telephone system typically will incorporate anywhere from 40 lines to 200 lines at each telephone station, the corresponding line status signals preferably are transmitted serially (i.e., sequentially) over the digital signal connection. In a similar manner, line-select information generated at the telephone station is transmitted serially over a single data line to the remote equipment. This signal ultimately controls the electronic crosspoint switch in order to establish or terminate connections between incoming lines and the selecting station.

As will be better understood from the detailed description of the preferred embodiment, the telephone stations communicate with the remote telephone equipment over very few conductors, i.e., a pair of serial digital data lines and a single voice line pair ("talkpath"). Generally speaking, each of the basic building blocks of the system is "intelligent", i.e., includes a microprocessor for processing data. For example, the telephone station itself contains a microprocessor for scanning its key field for line-selecting information, and also for scanning the indicating lamp field to update and refresh the indicating lamp data several times each second. Also, microprocessors are used to manage the digital data which is being transferred between the telephone station and the telephone equipment. These processors sort out incoming data and assemble outgoing data for transmission at the appropriate time slot of the overall timing cycle.

DETAILED DESCRIPTION OF THE PREFERRED EMBODIMENT

1. System Organization

Figure 1:
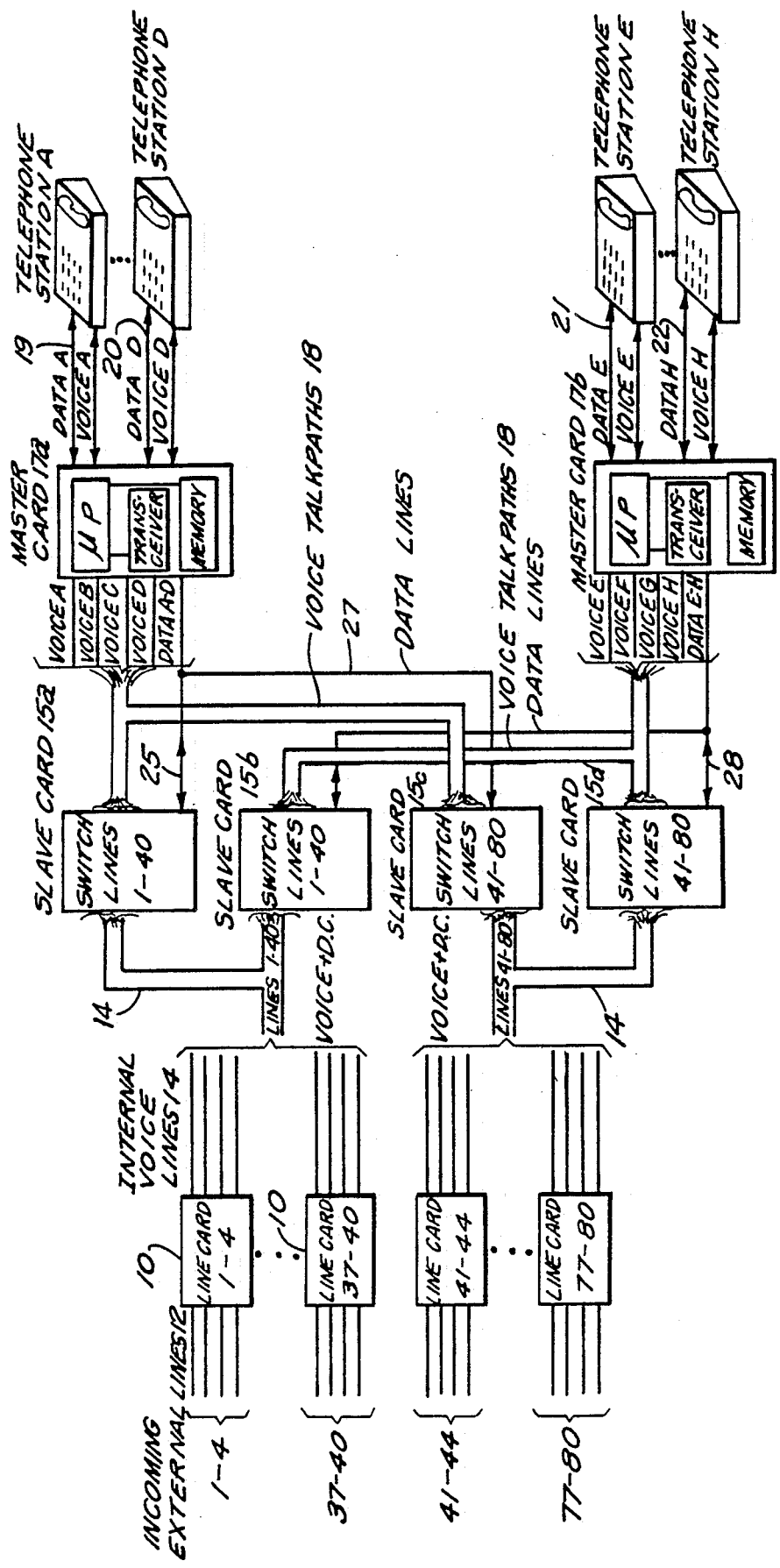
FIG. 1 is a schematic block diagram of a telephone system in accordance with the invention, illustrating the general physical layout and interconnections among the primary system elements.

In the preferred embodiment of the invention, the system components are distributed among several printed circuit cards containing a number of semiconductor components, as well as other electronic elements. FIG. 1 illustrates how each type of card fits into the system. Line cards 10 each provide an interface between four incoming external lines 12 and corresponding internal voice lines 14. In the typical case, the system is expandable in multiples of forty lines. Thus, ten line cards are required for each group of forty external lines to be served.

Referring again to FIG. 1 each group of forty internal voice lines 14 is made available to each telephone station in the system via slave cards 15a–15d. Each slave card is capable of interconnecting individual ones of the 40 voice lines with any one of four telephone stations A, B, C, D. If more than four telephone sets are used, e.g., telephone stations E, F, G, H in FIG. 1, an additional slave card 15b is required. Thus one slave card is required to interface each forty lines with each of four telephone stations. FIG. 1 shows the layout for a system having 80 incoming external lines (lines 1–40 and 41–80). Accordingly, two additional slave cards 15c, 15d are utilized to provide access of lines 41–80 to telephone stations A–H. Connections between the station talkpaths 18 and the internal voice lines 14 are made at the slave card.

The system also utilizes one master card for each four telephone stations. Thus, in FIG. 1, master card 17a services stations A–D, whereas master card 17b services stations E–H. Each master card controls up to five slave cards (i.e., up to 200 lines), where the actual switching of lines takes place. The master cards 17 organize and process (a) key press commands received from the stations and (b) status data received from the slave cards for transmission to the stations.

As stated earlier, voice signals are carried over a talkpath associated with each station. The voice signals are coupled via the master card to the crosspoint switches at the slave card. When a crosspoint switch is closed, the voice signals on a talkpath are connected to one of the voice lines. Data, such as line status data and command data affecting a line connection, are carried over data line pairs 19–22 running between a respective telephone station and the master cards. The voice and data lines connected to the telephone units are the only signal conductors running from the telephone to the equipment room. Data transmissions between the master cards 17 and slave cards 15, on the other hand, take place over individual data conductors 25–28 connecting each slave card with a master card. Each master card can address up to five slave cards, or in other words, up to 200 different lines.

2. Line Card

Figure 2A:
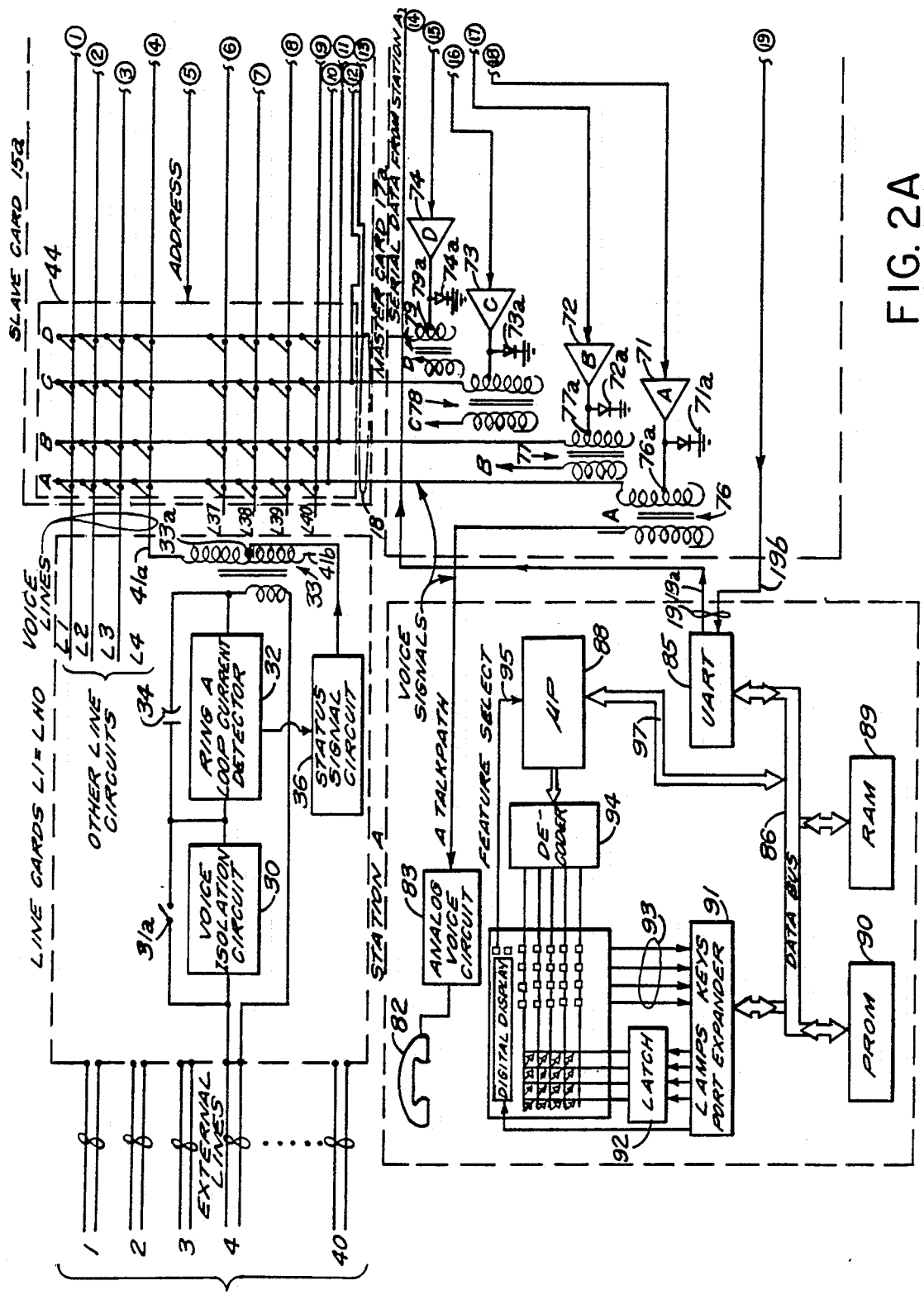
FIGS. 2A and 2B are system block diagrams showing the primary functional elements of the system and the manner in which they are interconnected.
Figure 2B:
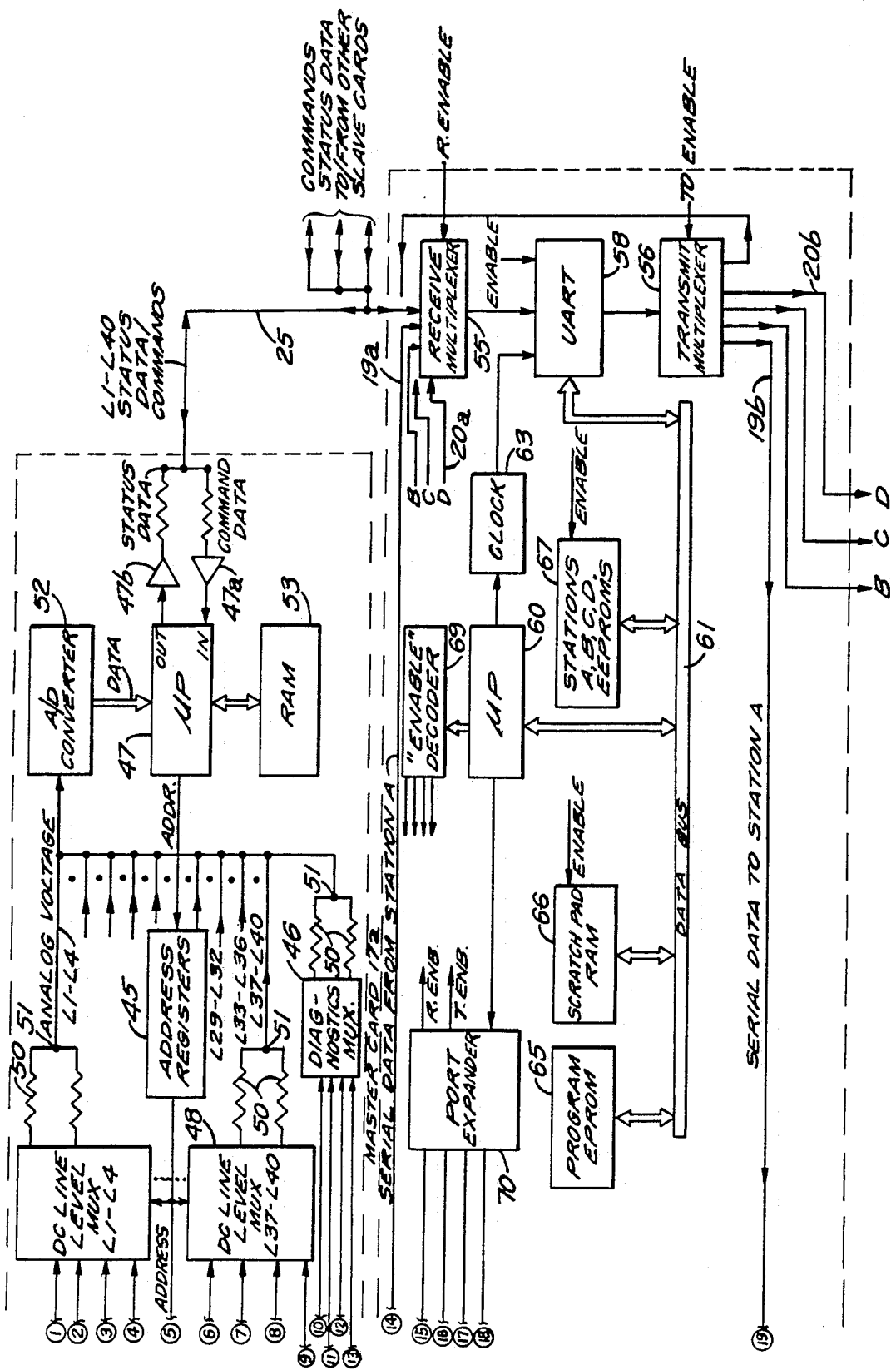

Turning now to FIG. 2, the external lines 12 feeding into the telephone system of this invention are shown on the left-hand side of the drawing. In practice up to 40 entering line pairs and up to ten line cards will be used; however, for purposes of illustration, a block diagram for only one circuit of a single line card is shown. It is understood that all line cards are identical, as are the circuit elements connected to each incoming line, regardless of which line card receives the external line.

An incoming signal on, for example, line no. 4, is routed to a voice isolation circuit 30, which prevents voice signals from being transmitted to or from an external line until such time as the line has been picked up at one of the telephone units. At that time the bypass relay contact 31a closes, whereupon voice signals are coupled through capacitor 34 to the voice transformer 33. Thus, when relay contact 31a closes, a voice circuit is established between the external line and the voice transformer 33. As will be apparent, the transformer 33 is used to preclude analog status signals on the internal voice line from appearing on the external line. It also enables a loop current to be maintained to occupy the external line while releasing the internal voice line.

When an incoming ring signal is detected, a status signal current 36 impresses a direct circuit voltage upon the center tap 33a of the transformer secondary winding. This dc signal appears at the end terminals of the winding and, because it is a common mode signal, does not interfere with the voice signal. The dc signal representing an incoming ring is one of several dc analog signals which may be impressed upon the voice line. These signal levels are: 0–0.4 volts for a "busy" or interconnected line, 1.66 volts for a line on "hold" or used for manual signaling; 3.3 volts for an "idle" line; and 5 volts for an incoming "ring." Circuit 36 operates to establish these various dc levels, superimposed upon the audio signals (if any) of the voice lines.

As previously stated, the use of a distinct signal superimposed upon the voice line for communicating status information reduces the required number of signal conductors and is unique to the invention. The analog voltages are sensed at the slave card. This results in a digital signal being generated and communicated (at the appropriate time) via the master cards to each of the telephone stations where, in the case of the ring signal (or a hold signal), the appropriate LED lamp is flashed for indicating an incoming or held call. In short, the dc level impressed upon the voice line is translated into a specific digital signal representing one of several predetermined operational states of the particular voice line. (It should be noted that, although single talkpath and voice line conductors are shown in FIG. 2, such voice lines and talkpaths are used in pairs). The second conductor of each pair has been omitted for clarity.

Figure 3:
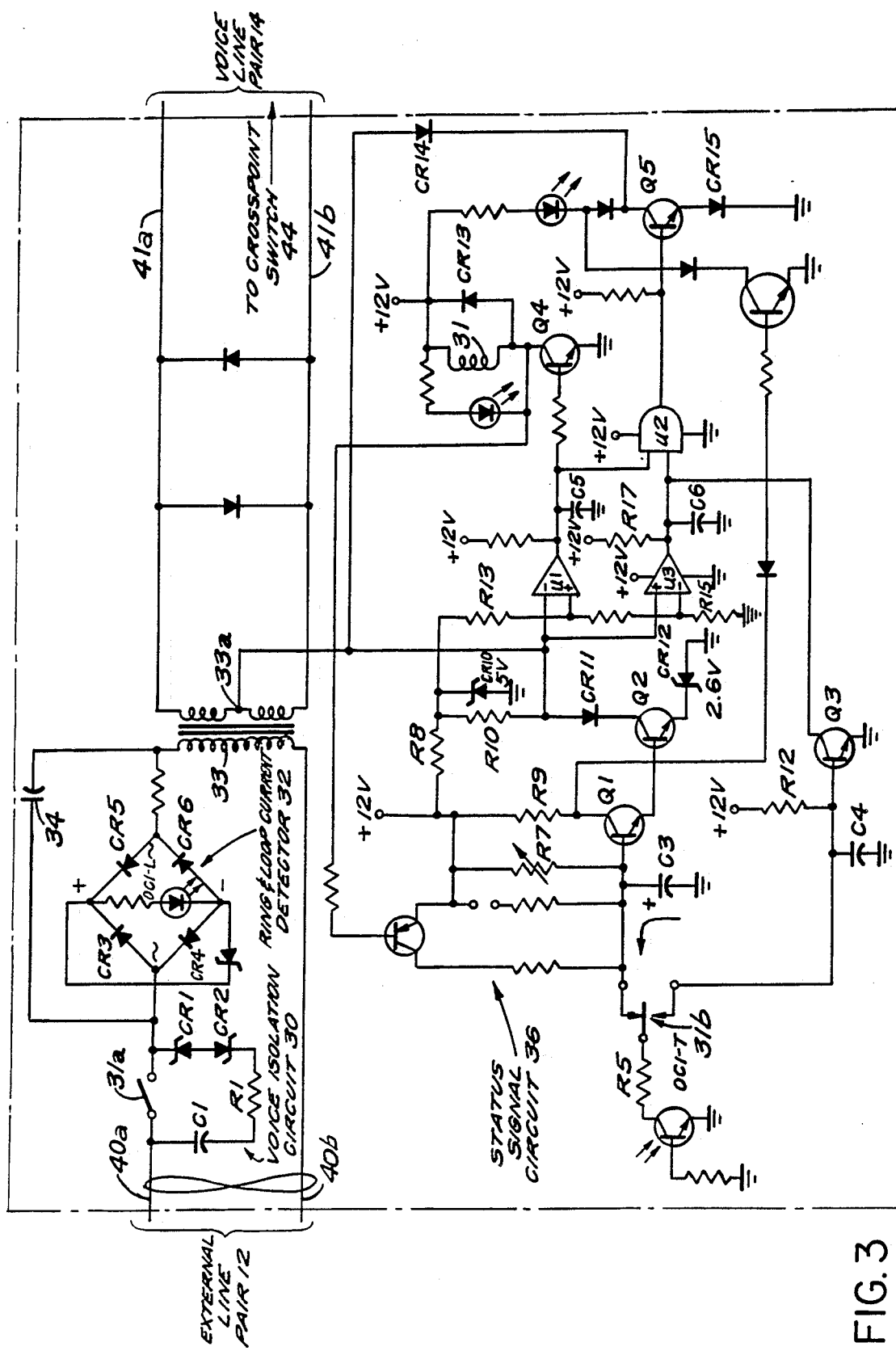
FIG. 3 is a schematic diagram of the line card circuitry which interfaces the incoming telephone lines with the remainder of the system.

The details of the line card circuitry are shown in FIG. 3. This circuitry performs the following functions for each of the four lines serviced by the card: ring detection, outside line pick-up, line hold and audio signal transmission. Once again, the line card does not communicate with the station equipment through conventional separate conductors for each different function. Rather, the line status is represented by a dc common mode voltage on the output voice lines.

A. Ring Detection

Turning to the line card schematic of FIG. 3, the incoming ac ring voltage on external line pair 40a, 40b is intecepted by voice isolation circuit 30, comprising the series circuit of capacitor C1, resistor R1 and the 20-volt zener diode pair CR1, CR2. The ring voltage is attenuated at CR1, CR2 then reaches detector circuit 32, constituted of a full wave rectifying bridge circuit CR3–CR6 whose output appears across the series path of resistor R2 and the light emitting diode OC1-L of an optical coupler. Diode CR7 limits the maximum output of the bridge detector.

Current in the LED OC1-L switches on the photo transistor section OC1-T, setting up a low impedance path to discharge normally-charged capacitor C3 through the normally-closed terminals of relay contacts 31b and resistor R5. The impedance of R5 is small, causing capacitor C3 to discharge rapidly. This reduces the voltage across C3 to turn off normally-conducting transistors Q1 and Q2. When Q2 ceases conducting, the potential at its collector, and thereby the potential at the center tap 33a of the audio transformer 33, attains the potential of zener diode CR10, which is the 5-volt dc signal representing an incoming ring. When Q2 is conducting, on the other hand, the potential at center tap 33a is equal to the sum of the voltage drops across zener diode CR12 (2.6 volts) transistor Q2 (0.5 volts) and diode CR11 (0.5 volts), or about 3.6 volts. This is the nominal "idle" voltage representing a free, or open, line.

In the absence of an incoming ring voltage (or loop current), optical coupler OC1-L turns off, and C3 charges through R7. The time constant is such that sufficient charge accumulates on C3 to switch Q1 and Q2 on between rings, and the dc ring voltage is maintained for about 7–14 seconds after disappearance of the ac input signal.

B. Answering the Incoming Call

When the incoming call is answered at one of the telephone stations (e.g., by lifting the receiver and pressing the flashing key), a digital signal is transmitted to master card 17 and, in response, slave card 15 is instructed to close the appropriate switch within crosspoint switch unit 44. (See FIG. 2). This connects voice line pair 41a, 41b to the talkpath of the telephone station picking up the call. Thereupon, the master card pulls the talkpath (and thereby the voice line) to a nominal ground potential. This potential represents a busy line, i.e., a line which has been picked up. The line card now operates the relay 31 to close contacts 31a and bypass voice isolation circuit 30. This operation is brought about as follows.

When the master card lowers the potential on the transformer center tap 33a to nominal ground, the negative terminal at differential amplifier U1 falls below a 2.2 volt level maintained at the positive input, causing the normally saturated collector output of U1 to open-circuit, permitting capacitor C5 to charge. At the same time, the positive input to differential amplifier U3 becomes negative relative to the one-volt level (maintained by voltage divider network R13, R14, R15) at its negative input. The output of U3 is therefore essentially grounded establishing a "0" at pin 2 of AND gate U2. Amplifier U1 biases transistor Q4 into conduction, thus energizing relay coil 31. As a result, relay contacts 31a disconnect optical coupler OC1-T from the ring detector circuitry and couple it to transistor Q3 of the loop current detector circuitry.

When acting as a loop detector, optical coupler OC1-L becomes energized by loop current (i.e., a flow of current through the external outside line via the path completed by the line card). This lowers the base potential of Q3, turning it off and thereby permitting the output of differential amplifier U3 to control pin 2 of AND gate U2.

C. Line Hold

To hold a line, loop current must be maintained while releasing the telephone station talkpath from the internal voice line. This frees up the telephone station and permits the user to connect with a different voice line. Loop current will flow as long as relay 31 remains energized and the connected party remains on the line.

An external line is put on "hold" by the line card whenever the master card raises the common mode voltage at transformer tap 33a from nominal ground ("busy") to about 1.6 volts ("hold"). This transition is detected at the positive input of amplifier U3, opening the low active output of U3 and allowing capacitor C6 to charge through resistor R17. Since the 1.6 volt signal is also less than the 2.2 volt reference at the positive input to amplifier U1, both inputs to AND gate U2 will be high, biasing transistor Q5 into conduction. Diode CR 14 and CR 15 are then forwardly biased to establish a continuous 1.6 volt common mode potential (the sum of the voltage drops across CR 14, and CR 15 and Q5).

This condition remains as long as there is loop current, whether or not the master card has released the crosspoint switch. If loop current ceases (as when the party at the other end of the line hangs up), phototransistor OCI-T is open-circuited and transistor Q3 therefore conducts, turning off transistor Q5. Since telephone connected to the other end of the external line completes the loop and maintains the loop current, the telephone station can return to and pick up the held line by simply pressing the key for the line "on hold". Pressing the key pulls the common mode voltage continuously to a nomimal ground which, in turn, drives U2 and U3 low to turn off transistor Q5. Also the key press signals the slave card to close the appropriate crosspoint switch to reconnect the telephone station to the voice line pair 41a, 41b.

D. Line Release

It should be noted that capacitor C6 at the output of amplifier U3 delays the build-up of the signal at pin 2 of gate U2. This delay enables the line to be released by allowing the common mode potential to rise to greater than 2.2 volts (the signal at the positive input to amplifier U1) when Q5 ceases conduction. This releases the line because the U1 output is driven to its low active state, turning off Q4 and deenergizing relay 31. The line will not go into the hold condition unless there is a pause of the common mode voltage at a level between 1.0 volt and 2.2 volts (namely, 1.6 volts) for a period longer than the time required to charge capacitor C6 to the "1" level. This delay is programmed into the system and eliminates the ambiguity between release and hold of a busy line.

3. Slave Card

The slave card performs two primary functions in the system: (1) actual line switching and (2) line status monitoring.

A. Line Switching

As shown in FIG. 2, voice lines L1-L40 from the line cards 10 are connected to the various rows of conductors in crosspoint switch 44. This switch, which in practice may comprise several four-line individual crosspoint switching CMOS integrated circuits, is controlled by addressing individual crosspoints between voice lines L1-L40 and the A, B, C and D talkpaths 18 for telephone stations A, B, C, D. When a crosspoint is addressed, a connection is made between the addressed voice line and the talkpath associated with the line-selecting telephone.

Addressing of the crosspoint IC's is controlled by a series of address registers 45, which individually address the selected crosspoint and apply the instruction bits for closing or opening the crosspoint connections. Slave card microprocessor 47 generates the address bits and instructions in serial form in accordance with data received at input unit 47a over serial line conductor 25 from master card 17a. These serial address bits are transmitted to address registers 45, which are serial-in/parallel-out shift registers. Address bits are clocked simultaneously into all shift registers, one bit at a time. The register outputs may be latched; therefore, once the address registers are loaded, it is possible to read the outputs at the same time that address data is being loaded into them. At the appropriate time slot in the timing cycle, the outputs of the address registers 45 are read. At that instant, all addressed crosspoints are opened or closed. Those which are not addressed remain in their preexisting state. Data in address registers 45 is constantly being refreshed, a complete set of data advancing through the registers, one stage at a time for each refreshing of data received from the master card.

B. Line Monitoring

To monitor the status of each line, the common mode analog voltages on voice lines L1-L40 are connected to respective inputs of a series of multiplexer integrated circuits 48. Each multiplexer handles four line pairs and provides, at its output, the analog voltage present on the addressed input line. To that end, multiplexers 48 are addressed by the registers 45. Multiplexer 48 have two outputs: one for each conductor of the addressed line pair. These outputs are interconnected through a pair of identical resistors 50 joined at a common measurement terminal 51. The voltage at terminal 51 is the average of the voltage appearing on each of the conductors. This voltage drives analog-to-digital converter 52.

As each voice line is addressed, the analog voltage at the output of one of the multiplexers 48 is received by A/D converter 52. The converted digital signal is thereupon read by microprocessor 47 for storage in RAM memory 53, which may be external or internal to the microprocessor. Since line status is represented by one of four possible analog signal levels, line status can be represented by two digital bits. Once again, it will be noted that all data transmitted or received by slave card 15a travels over serial conductor 25 linking slave card 15a (and up to 4 additional slave cards) with master card 17a.

A separate and further feature of the slave card is the diagnostic multiplexer 46. This unit can be addressed to read the talkpaths 18 for verifying the correct operation of crosspoint switch 44. For example, if a talkpath is busy, its status signal can be monitored for comparison with a standard, or with the status signal on a voice line to which it is supposed to be connected.

To summarize, data clocked into slave card 15a contains the line-select information and can be clocked directly into address registers 45 or temporarily stored in RAM 53 for subsequent loading of address registers 45. Data is clocked into slave card 15a at the rate of 9.6 kilobaud and is transmitted by slave card 15a at double that rate, i.e., 19.2 kilobaud.

4. Master Card

The chief functions of the master card are to manage the flow of data through the system and to set the analog busy and hold signals on the voice lines. The master card controls the slave cards on which the switching is done, and receives from and sends data to the slave cards and stations. As stated earlier each master card also provides four talkpaths 18 (A, B, C, D), one for each station which it services. Moreover, each master card can address up to a total of five slave cards over the same serial line (e.g., 25). Because of the unique system of signalling line status through the use of analog voltages on the voice lines, several conventional signal connections between the telephone turret and the line card are eliminated. As a result, data is transmitted serially to the slave cards over a single digital information line.

With reference to FIG. 2, digital data is received by master card 17a from the slave cards through a receiver multiplexer 55, and is transmitted to the respective stations through multiplexer 56. The reception and transmission of digital data is managed by UART device 58 (universal asynchronous receiver-transmitter). All data at the master card is processed under control of microprocessor 60, which communicates via a common data bus 61. Thus, data received from the slave cards and stations via multiplexer 55 is formatted in UART 58, stored, for example, in RAM 66, and called up by microprocessor 60 at the appropriate time slot. Similarly, the microprocessor may direct UART 58 to retrieve and transmit data in response to clock pulses from clock 63, it being understood that UART 58 converts parallel data present on the data bus into serial form and couples it to multiplexer 56.

The master card EPROM 65 contains its operating software. Also provided on the master card are four EEPROMS (electrically erasable, programmable read-only memories), one each for stations A, B, C, and D, collectively designated by numeral 67. EEPROMS 67 are programmed with a look-up table for each of the turrets. When appropriately addressed in response to key-press information from one of the turrets, EEPROMS 67 provide a corresponding digital signal representing the address of the crosspoint switch for connecting the corresponding line to the station talkpath. The key/line assignments, since they are programmable, may be changed by amending the look-up tables in the EEPROMS. Accordingly, the keys of the individual turrets are not wedded permanently to specific lines, and any key may be assigned to any line.

Microprocessor 60 also drives the "enable" decoder unit 69, the decoder producing "enable" signals for the EEPROMS 67 and UART 58. Multiplexers 55, 56 permit UART 58 to operate on up to four separate inputs and outputs. As mentioned above, UART 58 gathers in serial data from multiplexer 55 and reformats it for parallel communication with master card data bus 61. In a similar manner, UART 58 conveys data to multiplexer 56 by reading the parallel data on bus 61 and releasing it in serial bit form to multiplexer 56.

Multiplexers 55, 56 receive or transmit data to and from the stations A, B, C, D in accordance with an enabling, or control, signal from port expander 70, which is driven by microprocessor 60. Specifically, an "R Enable" control signal selects one of the four data inputs to multiplexer 55 to be passed to UART 58, whereas the "T Enable" signal selects a specific one of the four output lines which is to transmit data received from UART 58.

In addition to controlling the multiplexers, port expander 70 drives four inverters 71, 72, 73, 74, each being connected to the center tap 76a-79a of a respective output audio transformer 76, 77, 78, 79. Transformers 76-79 couple the audio signals from the station talkpaths to the corresponding talkpaths 18 connected to the crosspoint switch 44. When the crosspoint switch is closed, the master card is able to signal the line card by controlling the dc voltage on the transformer center-tap. The transformers isolate the common mode voltages, present on a talkpath 18 when its crosspoint switch is closed, from the audio signals coupled to the telephone instrument. Normally, the inverter outputs are in the open collector mode. If an associated talkpath 18 then becomes connected to a line card by closure of a crosspoint switch, the common mode voltage is kept at about 1.4–1.6 volts (the "hold" signal level) by the forward drop across the diode circuit (71a-74a) connected between the transformer center tap and ground.

It will be recalled from the line card description that, in order to close relay 31 and busy a line, a nominal ground potential (e.g., 0.4 volts) is established at the master card. This occurs when microprocessor 60, through the port expander 70, sends a "1" signal to the appropriate inverter. That causes the open-collector output stage of the inverter to saturate and, in essence, couple the center tap (76a-79a) of the associated transformer to ground. The signals at the output of the port expander are latched until altered by new signals from the microprocessor. Thus, once a connection has been established by the momentary depression of a non-locking key at the telephone station, it is not necessary to refresh the key-press information to maintain the connection. However a periodic refreshing signal mode of operation is also compatible with the architecture of the system.

If the voice line in question is a so-called manual ring-down line, which establishes a direct connection without dialing, or if the voice line is a dialtone line which the user wishes to put on hold, a low signal is sent to the appropriate inverter by port expander 70. This simply turns the inverter off and allows the forwardly conducting diode 71a-74a to load the voice line, whereby excitation provided by the line card establishes the common mode voltage at the 1.4-1.6 volt level. (In a manual ring-down line, the 1.4-1.6 volt level represents a "ring" signal instead of "hold.") If a dialtone line is to be put on hold, the master card waits approximately 200 milliseconds prior to signaling the slave card to release the line altogether. If a manual ring-down line is being signaled, the master card will simply leave the inverter off as long as the station is signaling out on the line. When a line is to be released (receiver placed back on the hook), the master card signals the slave card to release the line immediately (i.e., open the crosspoint switch), and thereby permit the line card to attain the 3.6 idle level without allowing the common mode voltage to pause at the hold or signal level long enough to trigger either function at the line card.

From the foregoing explanation, it should be clear that the slave cards continuously monitor the common mode voltages on all voice line pairs on the card. When the master card polls the slave card by addressing it over serial line 25, the slave card reports the status of the lines to the master card via the same serial line. As noted, these operations are substituted for the customary lamp signals and ring signals, which are conveyed over separate conductors in more conventional systems.

As earlier described, the master card also receives serial line-select, or so-called "key-press," information over conductor 19a from the station, and it transmits, at the appropriate time, all of the status data over serial conductor 19b to update the status indicating lamps of the lamp and key field at the telephone instrument.

5. Station Controller

Focusing once again on FIG. 2, at the left-hand side of the drawing, the telephone unit is outlined by broken line 81. The telephone unit of course contains the familiar handset 82 coupled to the talkpath through a conventional analog voice circuit 83. The unit may also be of the dual talkpath or alternate talkpath type, such as disclosed in copending application Ser. No. 608,239, filed May 8, 1984 entitled Dual Talk Path Key Phone and assigned the assignee of the present invention. The disclosure of the foregoing application is hereby incorporated by reference.

As noted above, the handset audio circuit is isolated from the common mode dc status voltages at the master card. Station unit 81 incorporates a UART 85 which interfaces the parallel format data on bus 86 with serial data on conductors 19a, 19b. Station 81 operates under the control of microprocessor 88, which is coupled via the data bus to RAM memory 89 and PROM memory 90, the latter containing the operating software for the station.

All line status data and line-select data is conveyed to and from the lamp and key field through port expander 91. As will be explained in more detail shortly, line status information which is to be used to drive the LED indicators at the telephone station is held in latch 92 while port expander 91 receives updated information over the data bus. Line-select information, on the other hand, is received directly by port expander over conductors 93, which become active only when a line-selecting key is pressed. The keys and lamp are repetitively scanned row-by-row in accordance with the output signals at decoder 94, which is driven by microprocessor 88. Any special feature selected by the user (e.g., hold, call-waiting, etc.) provides a signal to one of the ports of microprocessor 88 over one or more conductors 95.

Figure 4:
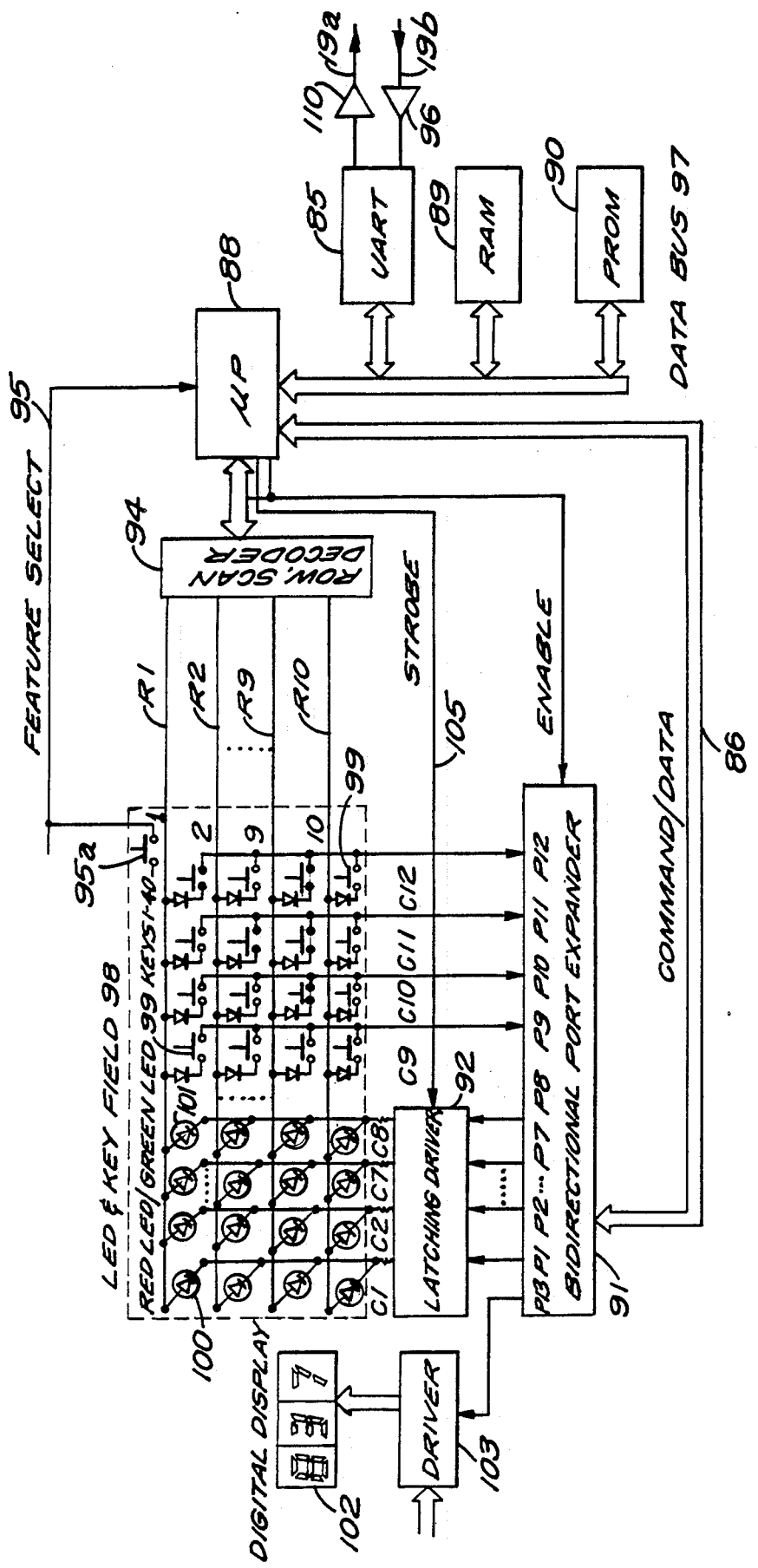
FIG. 4 is a schematic diagram of a portion of the telephone station, showing the line selecting key matrix and the LED indicating lamp matrix.

FIG. 4 shows in clearer detail the principle elements of the telephone station. Incoming data on serial conductor 19b is received by an optical coupler driver circuit 96 and coupled to the input of UART 85. Serial data received at UART 85 is converted to parallel form for transmission to the microprocessor data bus 97.

Shown in dashed outline in FIG. 4 is the LED indicator and key field 98 of the telephone station. Field 98 contains 40 non-locking pushbutton keys 99 and a corresponding number of red LED (light emitting diode) indicators 100 and green LED indicators 101. The red LED indicators are active if the line associated with it is a local line, the green indicator lamps are active if the line in question is a global line, it being understood that either the red or green (but not both) indicators will be lighted for any given line. Both the keys 99 and LED lamps 100, 101 of each color are arranged in a matrix of ten rows (R1 through R10) and four columns (C1 through C12), the intersection of one row and one column designating a specific one of 40 different lines.

One 40-key field is used for each set of 40 lines made available to the telephone station. If, for example, an additional 40 lines were to be made available at telephone station A, an additional 40-key field 98, together with its associated latching driver 92 and bidirectional port expander 91 would be incorporated. The additional elements would be interconnected with the microprocessor over the same command/data bus 86. However, microprocessor 88 would address the several port expanders sequentially. For purposes of illustration, a feature selection key 95a within key field 98 has been shown. This key, when pressed, sends a signal over conductor 95 to microprocessor 88.

In addition to LED lamps 100, 101, the station incorporates a fluorescent digital display 102 coupled to port P13 of the expander through the driver 103. The function of the display is to indicate the specific line which has been selected or is being used by that particular station. Display 102 is driven by the status data received from the master card, but only the data for the line selected by station A will be gated by port P13 to the display. Both units 102, 103 are of a conventional type, driver 103 being operative to convert serial data into suitable parallel format used by display 102.

A. Status Lamp Indicating

Lamp indicating data is transmitted from microprocessor 88 (or RAM 89) to bidirectional port expander 91. In communicating with the port expander, the microprocessor first transmits over bus 86 several commands bits telling the port expander whether the next action should be a "read" or "write" operation and at what output ports P1-P12 the action should take place. Ports P1-P8 are used to write data to latching driver 92 whereas ports P9-P12, (connected to the switch key columns) are used to read the line selection signals from the keys 99.

In the normal sequence, port expander 91 writes status information to latching driver 92 via ports P1-P4, then writes status information to ports P5-P8. However, data at ports P1-P8 is not entered into latching driver 92 until a strobe pulse over conductor 105 is sent by microprocessor 88. This strobe pulse, which loads all of the key field modules at once, is synchronized with the change in the horizontal scans of rows R1 through R10, which are driven by scanning decoder 94. In other words, the lamps 100 are excited one row at a time. Thus, if horizontal scan line R1 is activated at the same time that a low is established by latching driver 92 at column C1, the LED at the intersection of row R1 and column C1 will be lighted. Next, horizontal row R2 is excited by decoder 94 and, when the strobe signal at conductor 105 is applied to latching driver 92, any of vertical columns C1–C8 brought to an active low state at ports P1–P8 would cause the corresponding LED indicators at the intersection of the low active columns and the excited line to become active. It will be understood, of course, that the scanning operation takes place at a very high rate and that, although the LED lamps become lighted only when the corresponding horizontal line is active, the lamps appear to be continuously illuminated.

B. Switch Scanning

Each time a different horizontal scan line is made active, a new set switch data becomes available at port expander ports P9–P12. Any of the key switches 99 which are depressed at the time the row to which it is connected has been made active, a signal appears at one of the ports P9–P12. Because of the repetitive scanning, there is virtually no probability that a key-press command will be missed because of "key bounce", i.e., a mechanical chattering of the electrical key contacts.

The key-press signals are coupled to the command-/data bus 86 whenever a READ command addresses those ports. Such data, representing the line-selecting commands, is routed by microprocessor 88 to data bus 97 and UART 85 for transmission through inverter 110 and over serial conductor 19a to master card 17a, where it is received at multiplexer 55 (FIG. 2).

At the master card, received line-selecting data is applied to UART 58 and is used in two ways. (1) It is transmitted by multiplexer 56 to slave card 15a over serial conductor 25, where the slave card microprocessor 47 addresses the appropriate crosspoint switches to close or open the connections. (2) Line-selecting data also is processed by microprocessor 60 to condition port expander 70 to excite the appropriate inverter 71 and thereby apply an active low or inactive high on the station A talkpath conductor 18. The active low signal is the analog signal representing the "busy" status of the line. To that end, port expander 70 and inverter 71 maintain this low condition status on the line until it is released by one of the special feature keys (e.g., conference or hold) or until the handset 82 is placed back on hook.

The active low status signal which is impressed upon the talkpath conductors 18 and, via the switches, to the voice lines is distinct from the audio signals. It is within the scope of the invention to have the audio signals in an encoded or converted format. For example, digitalized audio signals are compatible with the invention provided that the status signals are distinct and detectable from the audio and that they are capable of isolation from the analog voice circuits.

6. System Operation

The system operates with a repetitive sequence as follows. Referring to FIG. 2, status data is assembled at the master card in scratchpad RAM 66 and then loaded over data bus 61 into UART 58 and transmitted in serial format to the telephone station via multiplexer 56 when the multiplexer is enabled. This data is sent in a block of 130 bytes. It is received by the telephone station and, as discussed in connection with FIG. 4, processed to illuminate the LED status indicators in the lamp field.

After transmitting status information to the telephone station, the master card conditions itself to receive the key-press, or line-selecting, data from the station. This, as explained above, is accomplished when port expander 91 (FIG. 4) in the telephone station reads the condition of input conductors 93. If any of the keys is pressed during this segment of the operational cycle, signals are developed and transmitted via UART 85 and serial conductor 19a to the receive multiplexer 55 at the master card. This key-press information is assembled in UART 58 of the master card and processed by a microprocessor 60. It may also be temporarily stored in scratchpad RAM 66.

Key-press data assembled by UART 58 is gated into one of the EEPROM memories 67 of the master card. If the key press data is being read from station A enable decoder 69 enables the station A EEPROM, which interprets the key press signal to develop a digital signal that represents the specific voice line associated with the key that has been pressed. If any of stations A–D have selected a line for connection, master card port expander 70 will apply an active low at the output of the corresponding inverter 71–74. Next, the key-press information is transmitted via multiplexer 56 and conductor 25 to each of the slave cards in a 13 byte block. This information, preferably in the form of the address of each line, is forwarded to address registers 45 of the slave card. These registers send the correct signals to address and close (or open) the appropriate crosspoint switch for the line which has been selected.

Following the closure (or opening) of the crosspoint switches, each slave card is addressed by the master card and commanded to transmit status data from the slave card to the master card. A slave card then sends 13 bytes of status information covering the 40 lines serviced by that card. The status data is stored in scratchpad RAM 66 of master card 17a. The next slave card is then addressed, and an additional 13 bytes of information is transmitted to master card 17a representing the status of each of the 40 lines of the second slave card, and so on, until all slave cards of the system (up to 5 cards) have transmitted their status information to the master card. The operational cycle then repeats itself, the whole cycle occurring at a rate of several times per second, assuming a data transmission and reception rate for the telephone station and master card of 19.2 kilobaud. The slave card transmission receives data at approximately half that rate, since it does not implement a UART.

From the preceding description, it should be apparent that the telephone system of the present invention incorporates a unique system of signaling the status of multiple lines with far fewer interconnection conductors than used in the systems of the prior art. The invention, which impresses upon the voice line conductors data signals that are distinct and detectable from the audio signals, is compatible with all conventional telephone equipment. The system is transparent to the central office equipment of the telephone company, the status signals being isolated and completely internal to the subscriber's telephone system.

Although the invention has been described with reference to a preferred embodiment, it should be understood that, except as specifically required by the patent claims, the system need not implement the identical elements described. For example, the combination of microprocessors, port expanders, universal asynchronous receivers and transmitters are utilized in the present system in a manner which applicants believe achieves the desired operational results in a efficient and effective manner. Nevertheless, other arrangements of specific elements are possible within the spirit and scope of this invention. As one specific alternative, the sequential order of the specific data communicating steps, as well as the data format could be changed or altered. The manner in which data is read into the system can also be altered without necessarily adversely effecting the system operation. It should therefore be understood that all modifications and alterations which would naturally occur to those of ordinary skill in the art are intended to be encompassed within the scope of the invention.

We claim:

1. In a multi-line key telephone system providing direct voice communication with selected telephone lines external to the system, the external lines being selectable by at least one telephone station, each station providing a talkpath and having line selecting keys and means for indicating the status of the selectable line, comprising:
   a voice line internal to the system, coupled to each of the respective external telephone lines;
   crosspoint switch means adapted for installation at a location remote from the telephone stations for selectably establishing, in response to activation of the telephone keys by the user, a voice signal connection between a selected voice line and a talkpath associated with the selecting telephone station;
   means for impressing upon said voice line a signal representative of the status of at least the connected voice lines, said status signal being distinct from voice signals carried by said talkpath; and
   means responsive to said status signal for activating the indicating means of each such telephone station to indicate the status of the voice lines.

2. The multi-line telephone system set forth in claim 1, further comprising:
   control means including a programmable memory for storing indications of the voice lines assigned to the respective telephone station keys, said control means being responsive to telephone key actuation to generate a command to effect a corresponding crosspoint connection of said crosspoint switch means.

3. The multi-line telephone system set forth in claim 1, wherein:
   said crosspoint switch means comprises at least one solid state device having individually controllable electronic switches for effecting an electrical connection between each telephone station talkpath and a selected one of said voice line.

4. The multi-line telephone system set forth in claim 1, wherein said status signal is an analog signal and the means responsive to said status signal includes:
   an analog/digital converter;
   means for individually connecting each of said status signals to said analog/digital converter to produce a corresponding digital status signal; and
   means for transmitting said digital signal to said telephone station to activate the status indicating means for each of said voice lines.

5. The multi-line telephone system of claim 4, comprising:
   means for interrogating the output of said analog/digital converter to sequentially transmit digital status data for individual voice lines.

6. The multi-line telephone system of claim 1, comprising:
   a data conductor coupling each telephone station with said crosspoint switch means for communicating digitally formatted switch control data therebetween independently of voice communication over said voice signal connection.

7. The multi-line telephone system of claim 1, wherein:
   each voice line comprises a pair of conductors, the direct current signal impressed thereon being in common mode relation to the voice signal carried thereby.

8. The multi-line telephone system of claim 7, comprising:
   means for averaging the signals appearing on said voice line conductor pair and coupled to said analog/digital converter, thereby to cancel audio signal components from the coupled signal.

9. The multi-line telephone system of claim 1, wherein:
   said signal impressing means is effective to produce different preselected voltage levels indicative of different line status conditions.

10. The multi-line telephone system of claim 9, wherein:
    said different preselected voltage levels correspond to at least two to the ring, hold and busy status conditions of the associated voice line.

11. The multi-line telephone system set forth in claim 1, further comprising;
    diagnostic sampling means for detecting the status signals on selected ones of said talkpaths to thereby detect the connection status of the sampled talkpath.

12. The multi-line telephone system of claim 1, comprising:
    a ring signal detector responsive to a ring signal on an external line; and
    means for isolating said ring signal from the corresponding voice line,
    said signal impressing means being effective to impress an analog voltage level on said corresponding voice line representative of an incoming ring status.

13. The multi-line telephone system of claim 1, wherein:
    the means responsive to said status signals includes means for signaling the telephone stations of the occurrence of an incoming call on the external line,
    the system further including means responsive to a telephone pick up at a telephone station for generating a signal representative of a line-selected condition on the talkpath for such station,
    the crosspoint switch means being responsive to said busy condition signal to close the crosspoint switch for interconnecting said talkpath and said corresponding voice line.

14. The multi-line telephone system of claim 13, further comprising:
    line termination means for indirectly coupling audio signals on the external line to an associated voice line while isolating any status signals from the external line, and
    means for precluding audio coupling of said external line to said voice line except when a command to connect a talkpath to said voice line occurs.

15. The multi-line telephone system of claim 4, wherein:

said connecting means sequentially routes said status signals for each voice line to said analog/digital converter, the corresponding digital signals being transmitted sequentially for reception by said telephone station.

16. The multi-line telephone system of claim 15, further comprising:

means for storing said digital signals prior to sequential transmission to said telephone status.

17. The multiline telephone system set forth in claim 1, further comprising:

control means including a programmable memory for storing and reassigning indications of the voice lines assigned to the respective telephone station keys, said control means being responsive to telephone key actuation to generate a command to effect a corresponding crosspoint connection of said crosspoint switch means.

18. In a multi-line key telephone system providing direct voice communication with selected telephone lines external to the system, the external lines being selectable by at least one telephone station, each station providing a talkpath and having line selecting keys and means for indicating the status of the selectable line:

a voice line internal to the system, coupled to each of the respective external telephone lines;

crosspoint switch means adapted for installation at a location remote from the telephone stations for selectably establishing, in response to activation of the telephone keys by the user, voice signal connections between selected voice lines and talkpaths associated with the selecting telephone stations;

means for impressing upon said voice lines signals representative of the status thereof, said status signals being distinct from voice signals carried by said talkpaths;

means responsive to said status signals for developing corresponding digital status signals;

a data conductor connected to said telephone station for serially transmitting said digital status signals to said station; and means associated with said telephone station and responsive to said serial digital status signals for activating the indicating means.

19. In a multi-line key telephone system providing direct voice communication with selected telephone lines external to the system, the external lines being selectable by at least one telephone station, each station providing a talkpath and having line selecting keys and means for indicating the status of the selectable line:

a voice line internal to the system, coupled to each of the respective external telephone lines;

controllable crosspoint switch means adapted for installation at a location remote from the telephone stations for selectably establishing, in response to activation of the telephone keys by the user, voice signal connections between selected voice lines and talkpaths associated with the selecting telephone stations;

means for impressing upon said voice lines signals representative of the status thereof, said status signals being distinct from voice signals carried by said talkpaths;

means responsive to said status signals for developing corresponding digital status signals;

means associated with the telephone station for developing at least one digital signal representing a line selected by activation of a line-selecting key of said station; and data management means for controlling the flow of digital data to and from said station, including means for serially transmitting line-selecting data from said station to said controllable crosspoint switch means for operating the appropriate crosspoint switches in accordance with the line-selecting data.

20. The telephone system of claim 19, wherein:

the status signal for a connected line is determined by an electrical condition on the talkpath associated with the selecting station, whereby the status signal appears on the selected line upon closure of the crosspoint switch.

21. In a multi-line key telephone system providing direct voice communication with selected telephone lines external to the system, the external lines being selectable by at least one telephone station, each station providing a talkpath and having line selecting keys and means for indicating the status of the selectable line:

voice lines internal to the system;

a transformer for coupling each of the respective external telephone lines to one of said voice lines and providing direct current isolation between said external line and said voice line;

crosspoint switch means adapted for installation at a location remote from the telephone stations for selectably establishing, in response to actuation of the telephone keys by the user, a voice signal connection between a selected voice line and a talkpath associated with the selecting telephone station;

a second transformer for providing direct current isolation in the talkpath between each station and said crosspoint switch means;

means for impressing upon said voice signal connection, a direct current signal representative of the status of at least the connected voice line, said direct current signal being restricted to said connection between said transformers and thereby isolated from said external lines; and means responsive to said direct current signal for activating the indicating means of each such telephone station to indicate the status of the lines.

22. The telephone system of claim 21, further comprising:

means responsive to said direct current status signal for developing a corresponding encoded signal; and a serial conductor for communicating said encoded signal to said telephone station, said station indicating means being responsive to such serially communicated encoded signal.

* * * * *